J. J. HEYS.
WELT BEATER.
APPLICATION FILED OCT. 19, 1905.

901,446.

Patented Oct. 20, 1908.
2 SHEETS—SHEET 1.

Witnesses:
Horace A. Crossman
Robert H. Kammler

Inventor:
John J. Heys
by Emery Booth Powell
Att'ys

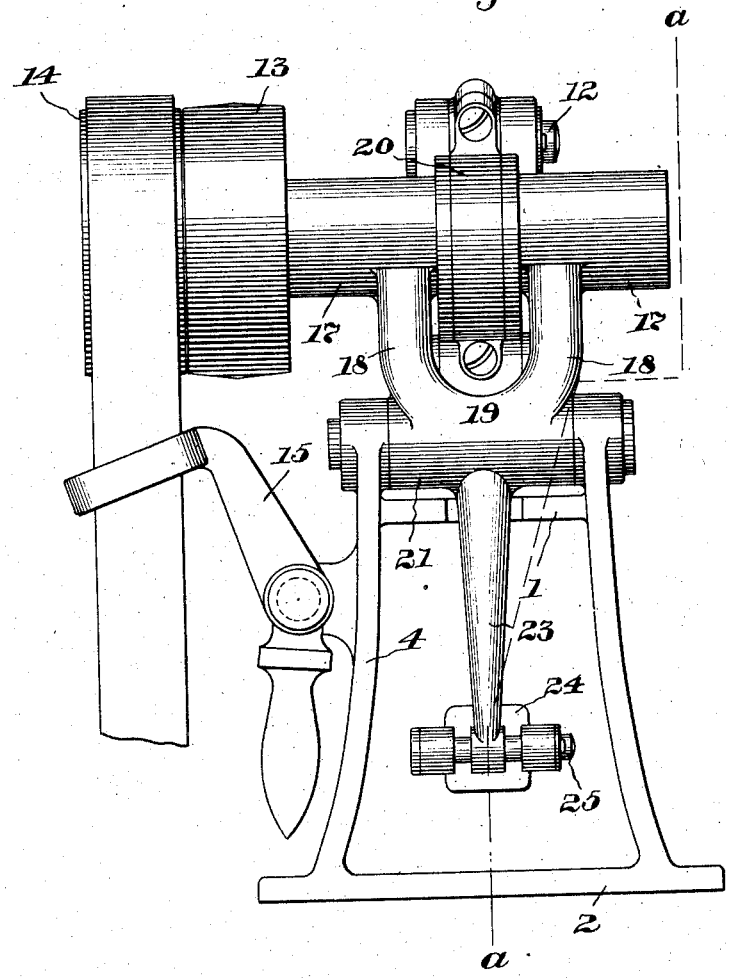

UNITED STATES PATENT OFFICE.

JOHN J. HEYS, OF LYNN, MASSACHUSETTS, ASSIGNOR, BY MESNE ASSIGNMENTS, TO MANUFACTURERS MACHINE COMPANY, OF MONTCLAIR, NEW JERSEY, A CORPORATION OF NEW JERSEY

WELT-BEATER.

No. 901,446.     Specification of Letters Patent.     Patented Oct. 20, 1908.

Application filed October 19, 1905. Serial No. 283,466.

*To all whom it may concern:*

Be it known that I, JOHN J. HEYS, a citizen of the United States, residing at Lynn, in the county of Essex, Commonwealth of Massachusetts, have invented an Improvement in Welt-Beaters, of which the following description, in connection with the accompanying drawings, is a specification, like letters on the drawings representing like ps My invention aims to improve welt beating machines for beating out a welt after it has been applied to an upper and before the sole is laid or applied, in order to flatten the welt and cause it to project substantially in or parallel with the plane of the sole.

Figure 1:
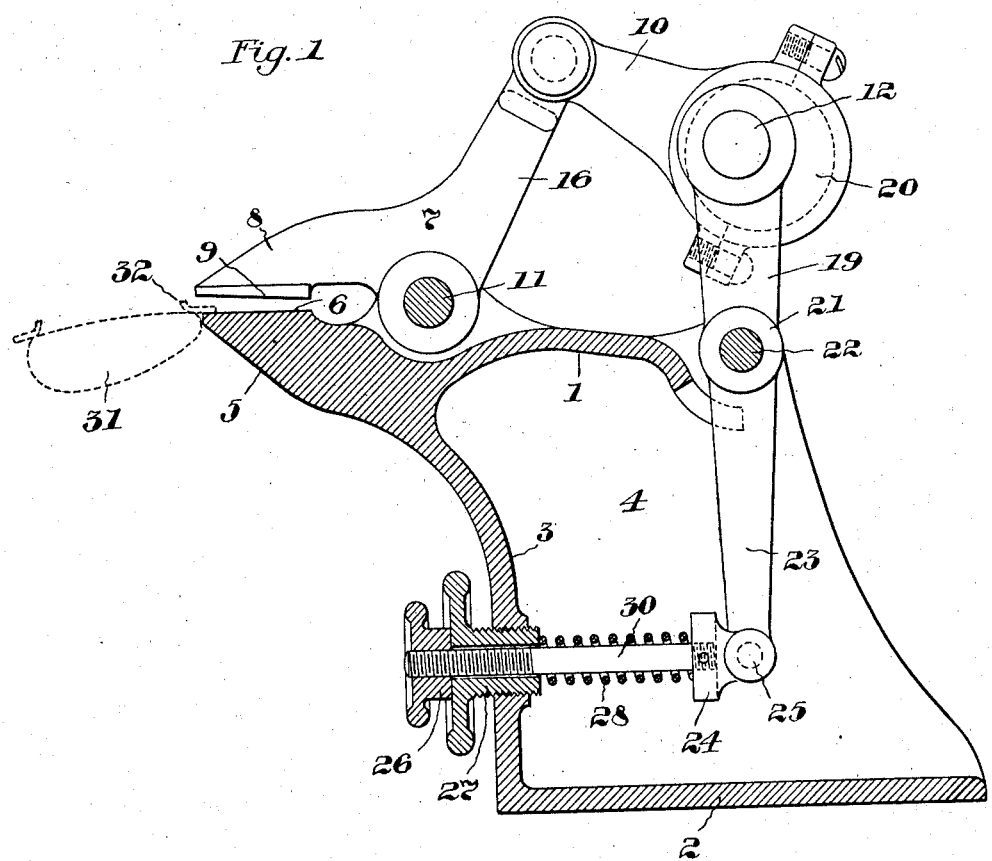
Figure 3:
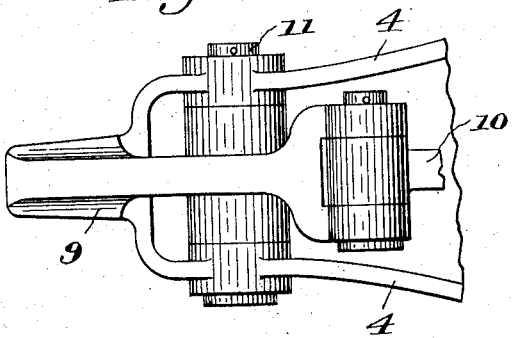

Referring to the drawings,—Figure 1 is a vertical section—taken on the line *a*—*a*, Fig. 2—of a machine selected for illustration of the invention herein; Fig. 2 is a rear elevation, and Fig. 3 a top or plan view of the front portion of said machine.

In the invention as illustrated the frame 1 is made in any suitable or desired shape, it comprising as herein shown a base 2, adapted to be secured to a bench or column, a front wall 3, and side walls 4. The front wall curves outwardly and upwardly toward the top and is shaped to form a solid anvil or welt support 5 having a flat horizontal surface 6 for receiving the welt. Said anvil has preferably a straight or nearly straight front edge with tapering or slanting sides leading thereto forming a narrow front portion adapted to facilitate easy handling of the shoe in beating, and particularly to facilitate the entrance of said support into the crease of a shoe so as to enable substantially the entire width of the welt to be acted upon.

Just back of the welt support the frame has a horizontal pivot pin 11 upon which is pivotally mounted a hammer or welt beater 7, formed as a bell crank lever having its horizontal arm 8 extended forward and shaped to form a hammer or beater head 9 in juxtaposition and for coöperation with the welt support 5. The beating face of the beater is shown as flat and has a straight or nearly straight front edge with tapering sides similar to that of the welt support, in order to effect a suitable flattening of the welt interposed between the coöperating faces of the beater and the welt support. The other and upright arm 16 of the beater is pivotally connected to an eccentric 20 mounted on the drive shaft 12, the latter having fast and loose pulleys 13 and 14 (see Fig. 1) controlled by a suitable belt shifter 15.

Instead of mounting the drive shaft in a fixed frame, as is usual, it is in accordance with my invention journaled in movable bearings 17 carried by and preferably integrally formed upon the forked arms 18 of an upright or vertical lever 19. Extending transversely from this lever and in the vertical plane of the forked arms 18 are tubular fulcrum bearings 21, to receive a pivot or fulcrum pin 22 supported in the side walls of the frame. By mounting the drive shaft in this manner it may be swung back and forth toward the welt support by the adjusting means now to be described to vary the limits of the stroke or oscillation of the beater.

The lower arm 23 of the lever 19 is pivotally connected at 25 to the bifurcated head 24 of an adjusting rod 30. This rod is extended forward through the front wall 3 of the frame and at its front end is threaded to receive the tension nut 26. This nut 26 is seated upon an adjusting or seat screw 27 tapped into the frame and through which the adjusting rod slides freely. A tension spring 28 is mounted on the rod 30 between the head 24 and the seat screw 27, the tension of the spring tending to force the lower end of the lever 23 toward the rear (see Fig. 1) until the tension nut 26 is seated upon the head of the seat screw 27, when further motion in that direction is arrested. The rod 30 and the lower arm 23 of the lever 19 are movable toward the front of the machine upon compression of the tension spring 28, this arrangement permitting the shaft 12 mounted upon the upper arm of the lever 19 to swing rearwardly when the beater in its downward stroke contacts with an interposed welt, thus providing ample yield of the beater to cushion the effect of its blows upon the welt. By turning the adjusting or seat screw 27, the rod 30 is moved in either direction, as desired, but without varying the spring tension, thus to move the drive shaft 12 toward or from the welt support and vary the position of the arc through which the beater head oscillates, or in other words, to vary the approach of the beater to and its recession from the welt support. The distance or interval between the welt support and the beater head is thus made adjustable to accommodate any thickness of welt; while in any desired adjustment the tension of the spring and the resultant force of the beater blows may be varied by turning the tension nut 26.

By providing an oscillating beater where the beating surfaces open and close like a pair of jaws, the angular opening between the beating surfaces is especially adapted to receive the shoe-attached welt, which before it is beaten down naturally conforms to or fits into the said angular opening, the nip or bend of the welt next the upper or inseam overlying the front edge portion of the support and in the widest part of the angular opening, while the edge portions lie nearer to the vertex of the said opening. The blows of the beater are thus more evenly distributed over the surface of the welt than is possible with machines employing reciprocating beaters and the nip or bend of the welt is not beaten any more than is necessary to produce the desired result. The beating is done only where it is most needed and without straining or breaking the seams, the quality and durability of the welt being unimpaired.

To operate the machine the belt is shifted to the fixed pulley rotating the drive shaft and eccentric to produce rapid oscillations of the beater. A shoe 31, shown in dotted lines in Fig. 1, is then brought into position with the bottom of the crease against the edge of the welt support, the welt 32 attached to the upper overlying the face of the welt support where it will receive the rapid blows of the beater and be flattened out upon the support and thereby made to lie flat or straight out from the upper in proper position to receive the outer sole. The shoe is then turned gradually to cause all sections of the welt to pass over the welt support till the whole welt has been flattened out in this manner to coincide with the plane of the insole.

In the usual adjustment of the machine the beater is oscillated so that it does not strike the welt support, the clearance, which is adjustable, corresponding to the thickness of the welt used.

Claims—

1. A welt beating machine comprising a welt support, a cushioned beater, and a single regulating device for varying the approach stroke of the beater and the cushioning effect of its blows upon the welt.

2. A welt beating machine comprising a welt support, a beater mounted adjacent thereto and coöperating therewith, a rotary member having a movable support connected with and to operate the beater, and means for changing the position of the support of the rotary member to vary the distance between the beater and the welt support.

3. A welt beating machine comprising a welt support, a beater coöperatively mounted adjacent thereto, a rotary member connected with and to operate the beater, and means for changing bodily the position of the rotary member to vary the distance between the welt support and the beater, and for varying the cushioning effect of the blows of the beater upon the welt.

4. A welt beating machine comprising a welt support, an oscillatory beater, a rotary member connected with and to operate the beater, pivotal supports for said beater and member respectively, and means for changing the relative positions of the pivotal supports of the rotary member and beater to adjust the beating.

5. A welt beating machine comprising a welt support, a beater, means for operating the beater including a shaft and transmitting means intermediate the shaft and beater, means for operating the shaft, and means for changing the position of said shaft to adjust the distance between the welt support and the beater.

6. A welt beating machine comprising a welt support, a cushioned beater, means for operating the beater including a shaft and transmitting means intermediate the shaft and beater, means for operating the shaft, and means for changing the position of said shaft to adjust the distance between the welt support and the beater, and the cushioning effect of the blows of the beater.

7. A welt beating machine comprising a frame, a welt support on said frame, a beater adjacent the support, a lever pivoted to said frame and provided with shaft bearings, a drive shaft journaled in said bearings, transmitting means intermediate the shaft and the beater, means for rotating the shaft to actuate the beater, and adjusting means connected to the pivoted lever to move the shaft toward or from the support to vary the distance between the welt support and the beater.

8. A welt beating machine comprising a welt support, a beater, a shaft, positive driving connections between the shaft and said beater, and means for changing the position of the shaft to adjust the distance between the beater and the welt support.

9. A welt beating machine comprising a vertically immovable welt support, an automatic beater, means for preventing the beater from striking the support, said means being independent of the beater, and means for cushioning the effect of the blows and for regulating the amount of cushioning.

In testimony whereof, I have signed my name to this specification, in the presence of two subscribing witnesses.

JOHN J. HEYS.

Witnesses:
Wm. Bennett Murphy,
Robert H. Kammler.